US009979722B2

United States Patent
Li et al.

(10) Patent No.: US 9,979,722 B2
(45) Date of Patent: May 22, 2018

(54) METHOD AND APPARATUS FOR PROCESSING A RTCWEB AUTHENTICATION

(71) Applicant: Futurewei Technologies, Inc., Plano, TX (US)

(72) Inventors: Li Li, Bridgewater, NJ (US); Wu Chou, Basking Ridge, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 198 days.

(21) Appl. No.: 14/978,147

(22) Filed: Dec. 22, 2015

(65) Prior Publication Data

US 2016/0182504 A1 Jun. 23, 2016

Related U.S. Application Data

(60) Provisional application No. 62/095,676, filed on Dec. 22, 2014.

(51) Int. Cl.
*G06F 17/30* (2006.01)
*H04L 29/06* (2006.01)
*H04L 29/08* (2006.01)

(52) U.S. Cl.
CPC .......... *H04L 63/0861* (2013.01); *H04L 67/14* (2013.01); *H04L 67/141* (2013.01); *H04L 67/2814* (2013.01)

(58) Field of Classification Search
CPC ............... H04L 63/0861; H04L 67/141; H04L 67/2814; H04L 67/14
See application file for complete search history.

(56) References Cited

U.S. PATENT DOCUMENTS

| | | | | |
|---|---|---|---|---|
| 2001/0044896 A1* | 11/2001 | Schwartz | ................ | G06F 21/31 713/169 |
| 2010/0235516 A1* | 9/2010 | Nakamura | .......... | H04L 65/1046 709/227 |
| 2013/0247164 A1* | 9/2013 | Hoggan | ................ | H04W 12/06 726/8 |

OTHER PUBLICATIONS

Li Li et al. "Who is calling which page on the web?" IEEE Internet Computing 18(6):26-33 (2014).
E. Rescorla, "Security Considerations for WebRTC," draft-ieff-rtcweb-security-07, RTFM, Inc., Jul. 4, 2014, 25 pages total.

* cited by examiner

*Primary Examiner* — Mohammed Waliullah
(74) *Attorney, Agent, or Firm* — Futurewei Technologies, Inc.

(57) ABSTRACT

Systems and methods of processing a real-time communication in web-browsers (RTCWEB) authentication by a first server are disclosed. These include receiving a message from a first user equipment including a first identity of a first user, a first fingerprint of the first user equipment and a first signature generated from a first Identity provider (IdP), sending a call offer message including the first identity, the first fingerprint and the first signature to a second server associated with a second user equipment, receiving from the second server a first challenge message that request an authentication for the first identity, and redirecting the first user equipment to access the second server.

18 Claims, 6 Drawing Sheets

```
v=0
o=- 1181923068 1181923196 IN IP4 ua1.example.com
s=example1
c=IN IP4 ua1.example.com
a=fingerprint:sha-1 \
4A:AD:B9:B1:3F:82:18:3B:54:02:12:DF:3E:5D:49:6B:19:E5:7C:AB
a=identity:\
 eyJpZHAiOnsiZG9tYWIuIjoiZXhhbXBsZS5vcmciLCJwcm90b2NvbCI6ImJvZ3Vz\
 In0sImFzc2VydGlvbiI6IntcImlkZW50aXR5XCI6XCJib2JAZXhhbXBsZS5vcmdc\
 IixcImNvbnRlbnRzXCI6XCJhYmNkZWZnaGlqa2xtbm9wcXJzdHV2d3l6XCIsXCJ\
 aWduYXR1cmVcIjpcIjAxMDIwMzA0MDUwNlwifSJ9
a=to-challenge:http://www.site-a.com/sessions/123
a=...
t=0 0
m=audio 6056 RTP/SAVP 0
a=sendrecv ...
```

FIG. 4A

```
a=identity:{Alice's identity on IdP A}
a=challenged-by:http://www.site-b.com/sessions/567?auth-token=...
```

FIG. 4B

```
a=identity:{Bob's identity on IdP B}
a=to-challenge:http://www.site-b.com/sessions/567
```

FIG. 4C

```
a=identity:{Bob's identity on IdP B}
a=challenged-by:http://www.site-a.com/sessions/123?auth-token=...
```

FIG. 8 ial Patent Application 62/095,676, filed Dec. 22, 2014, and
METHOD AND APPARATUS FOR PROCESSING A RTCWEB AUTHENTICATION

CROSS-REFERENCE TO RELATED APPLICATIONS

The present application claims priority to U.S. Provisional Patent Application 62/095,676, filed Dec. 22, 2014, and entitled "SYSTEM AND METHOD TO INTEGRATE WEB IDENTITY PROTOCOLS WITH WEBRTC BASED ON SESSION CHALLENGES" which is incorporated herein by reference as if reproduced in its entirety.

TECHNICAL FIELD

The present disclosure relates generally to a real-time communication, and more particularly to a real-time communication in web-browsers (RTCWEB).

BACKGROUND

In computing, a web browser is a software application for retrieving, presenting, and traversing information resources on the internet. A web application is a client-server software application in which the client (or user interface) is displayed to a client using a web browser.

Web applications are popular due to the ubiquity of web browsers, and the convenience of using a web browser as a client to update and maintain web applications. Common web applications include webmail, online retail sales, online auctions, wikis, instant messaging services and many other functions.

Web applications have been developed to support video and/or audio calls between user devices. For example, a local user may wish to call a remote user via a web browser. The user may interact with the interface to determine that the remote user is available. The local user may then make the call. The remote user may then accept or deny the call request. Various security protocols may be employed to assure that the party appearing as the remote user is actually the remote user and not a malicious entity and vice versa. RTCWEB may be a standardized protocol suite, which may support web based user to user interaction. However, RTCWEB may not be completely backwards compatible with legacy security devices as such security devices may not support all protocols required for full RTCWEB functionality.

SUMMARY

In one embodiment, a method of processing a real-time communication in web-browsers (RTCWEB) authentication by a first server is disclosed that includes receiving a message from a first user equipment including a first identity of a first user, a first fingerprint of the first user equipment and a first signature generated from a first Identity provider (IdP), sending a call offer message including the first identity, the first fingerprint and the first signature to a second server associated with a second user equipment, receiving from the second server a first challenge message that request an authentication for the first identity, and redirecting the first user equipment to access the second server.

In another embodiment, a method of processing a real-time communication in web-browsers (RTCWEB) authentication by a first user equipment is disclosed that includes sending a call offer message including a first identity of a first user, a first signature generated from a first identity provider (Idp) and a first fingerprint of the first user equipment to a second server associated with a second user equipment via a first server, receiving from the first server a redirection message that instructs the first user equipment to access the second server, accessing the second server, and performing an authentication for the first identity with the second server and the first Idp.

In yet another embodiment, a first server for processing a real-time communication in web-browsers (RTCWEB) authentication is disclosed that includes a memory storage comprising instructions and one or more processors coupled to the memory that execute the instructions. The instructions are executed to receive from a first user equipment a message including a first identity of a first user, a first fingerprint of the first user equipment and a first signature generated from a first Identity provider (IdP), send a call offer message including the first identity, the first fingerprint and the first signature to a second server associated with a second user equipment, receive from the second server a first challenge message that request an authentication for the first identity, and redirect the first user equipment to access the second server.

In yet another embodiment, a first user equipment for processing a real-time communication in web-browsers (RTCWEB) authentication is disclosed that includes a memory storage comprising instructions and one or more processors coupled to the memory that execute the instructions. The instructions are executed to send a call offer message including a first identity of a first user, a first signature generated from a first identity provider (Idp) and a first fingerprint of the first user equipment to a second server associated with a second user equipment via a first server, receive from the first server a redirection message that instructs the first user equipment to access the second server, access the second server, and perform an authentication for the first identity with the second server and the first Idp.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Real-Time Communication in WEB-browsers ("RTCWEB") communication protocol suite is set forth in Internet Engineering Task Force (IETF) document entitled "draft-ietf-rtcweb-security-arch-07" dated (Jul. 4, 2014), which is hereby incorporated by reference as if reproduced in full. RTCWEB allows browser-to-browser communications such as voice calling, video chat, peer to peer (P2P) file sharing, audio calls, etc., without requiring web browser plugins. For example, the RTCWEB architecture may be implemented a protocol suite that supports direct real-time media transfer between web browsers by employing the European Computer Manufacturers Association (ECMA) scripting language (ECMAScript) based application programming interfaces (APIs) in web interface definition language (WebIDL). RTCWEB may be based on federated identity systems where user equipments can authenticate themselves to each other through identity providers (IdPs) that may not be controlled by associated calling sites, for example OpenID, Web Identity (WebID), Open Authentication (OAuth), and/or Mozilla Persona. However, RTCWEB may be not compatible with some federated identity protocols. For example, RTCWEB may require that all IdPs sign an arbitrary string such as a datagram transport layer security (DTLS) fingerprint, to cryptographically bind secure real-time transport protocol (SRTP) and/or DTLS to a particular user identity. RTCWEB may also require that all IdPs be configured to verify signatures. However, some federated identity protocols, such as WebID and OAuth 2.0, may not support these services.

To address the mismatch problems related to the RTCWEB security architecture, this disclosure provides an architecture capable of adapting identity protocols incompatible to the RTCWEB security architecture to establish RTCWEB calls between user equipments (e.g. web browsers).

Figure 1:
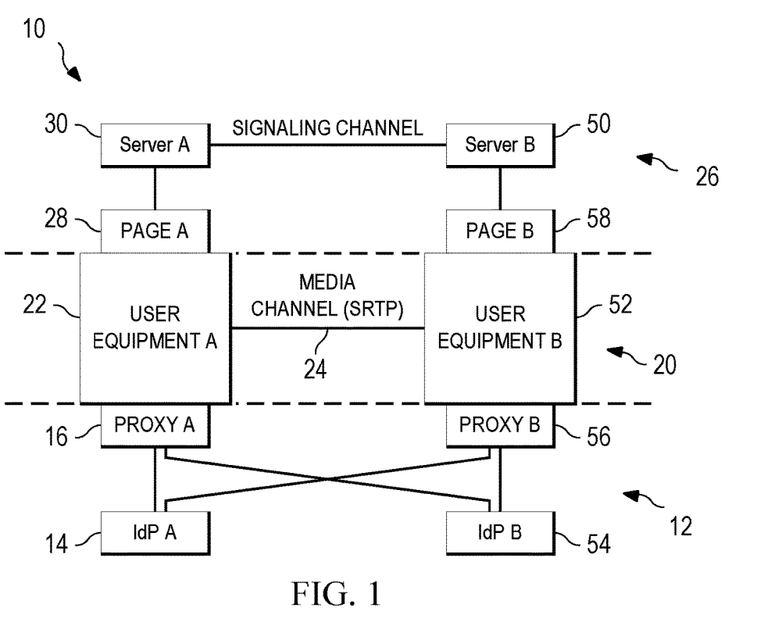
FIG. 1 is a schematic diagram of an embodiment of an RTCWEB network architecture.

FIG. 1 is a schematic diagram of an embodiment of an RTCWEB network 10 architecture. The RTCWEB network 10 consists of three distinct layers of components, i.e., an identity layer 12, a media layer 20, and a signaling layer 26. The layer boundaries between these areas are marked by dashed lines. The identity layer 12 consists of IdP A 14 and IdP B 54 that can authenticate an identity of a user and the proxy A 16 and proxy B 56. The media layer 20 of FIG. 1 consists of user equipments (e.g. web browsers) that exchange secure real-time media based on secure real-time protocol (SRTP) on a media channel 24. The signaling layer 26 of FIG. 1 consists of page A 28, page B 58, server A 30, and server B 50. Server A 30 and server B 50 may be used to control the calls between the user equipment A 22 and the user equipment B 52.

Signaling layer 26 is not standardized by RTCWEB, and the server A 30 and the server B 50 can use any standard or proprietary voice over internet protocol (VOIP) signaling protocol, such as SIP, XMPP Jingle or Skype, to establish calls between user equipment A 22 and user equipment B 52.

User equipment A 22 and user equipment B 52 may each be any device and/or software that may act as a source and/or destination of an RTCWEB based connection. In one example, the user equipment may comprise personal computer (PC), smart phone, tablet PC, web browser, web browsing software, web browsing software operating on smart phone, etc.

Server A 30 and server B 50 may be any hardware and/or software component configured to initiate, maintain, and/or host such an RTCWEB communication, for example, a website server, data center component, file server, application server, communication server, etc. While server A 30 and server B 50 are illustrated as being different blocks, it is expressly contemplated that both user equipment A 50 and user equipment B 52 may connect to the same server.

IdP A 14 and IdP B 54 may be any hardware and/or software component configured to issue identification/authentication information to identify the user equipment A 22 or user equipment B 52 for security purposes. An IdP may be, for example, web servers, data center components, application servers, communication servers, etc. In one embodiment, a user equipment may send a sign request to a IdP via a proxy, and the IdP may issue identification/authentication information to the user equipment via the proxy.

Figure 2:
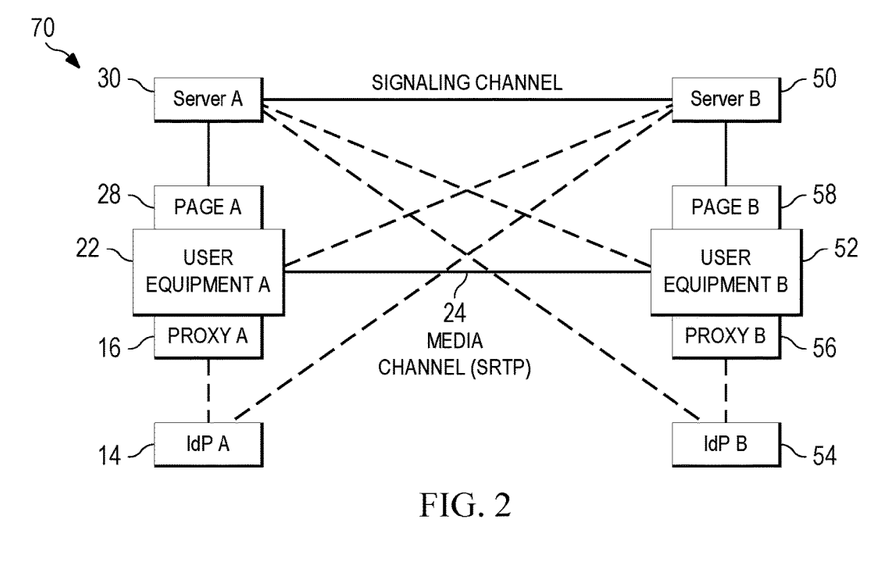
FIG. 2 is a schematic diagram of another embodiment of an RTCWEB network architecture.

FIG. 2 is a schematic diagram of another embodiment of an RTCWEB network 70 architecture. According to the disclosure, the user equipment may trust their servers for user authentications, without restricting what protocol is used for the authentications. The main difference between the embodiment of FIG. 2 and the embodiment of FIG. 1 lies in that user equipment A 22 may authenticates to server B 50 using IdP A 14, and user equipment B 52 may authenticates to server A 30 using IdP B 54, which is shown as two dashed triangles in FIG. 2.

Figure 3:
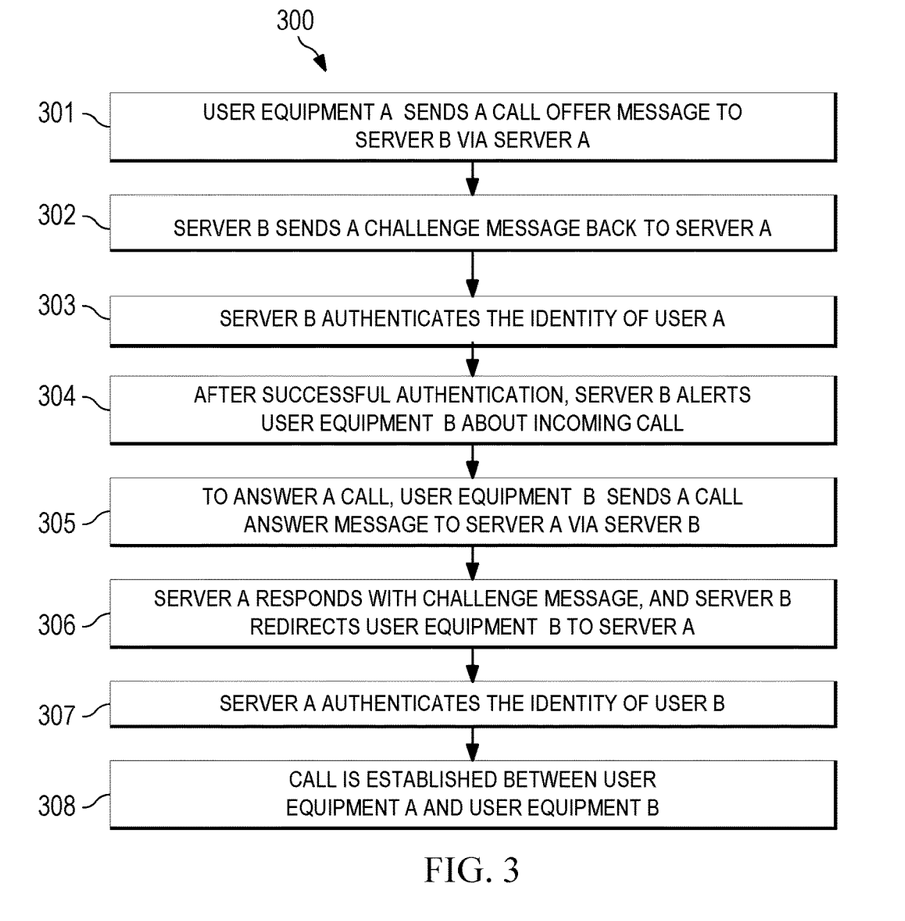
FIG. 3 is a flow diagram of an embodiment of a method of processing a RTCWEB authentication.

FIG. 3 is a flow diagram of an embodiment of a method 300 of processing a RTCWEB authentication. For example, the embodiment method 300 may be implemented in the context of the RTCWEB network 70 architecture as illustrated in FIG. 2. The embodiment method 300 may proceed as follows as shown in FIG. 3.

At step 301, user equipment A 22 contacts server A 30 and then sends a call offer message to server B 50 via the server A 30. In an example, the call offer message may include an identity of a user A associated with the user equipment A, a fingerprint (e.g. fingerprint-a) and a signature (e.g. signature-a).

A fingerprint may be used to bind the communication to a key pair. This key pair may simply be ephemerally generated for this call or specific to this domain. A signature may be a mathematical scheme for demonstrating the authenticity of a digital message or document.

Figure 4A:
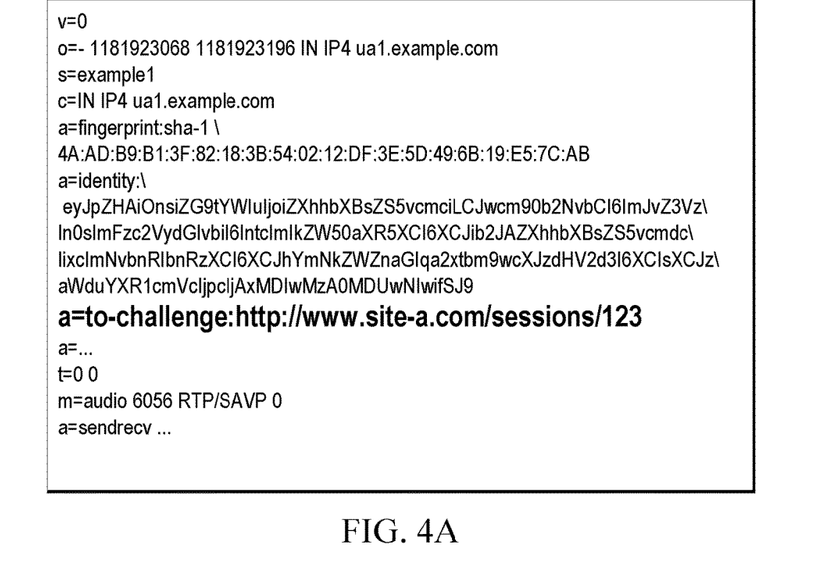
FIG. 4A is a schematic diagram of a format of an example offer SDP message.

In an implementation, the server A 30 may create a session (e.g. session-a) to hold fingerprint-a from the user equipment A 22 and signature-a generated from IdP A 14. In another implementation, the call offer message may be a session description protocol (SDP) message. For example, the call offer message may be an offer SDP message which specifies where server B may send a challenge message. A format of an example offer SDP message is illustrated in FIG. 4A.

Figure 4B:
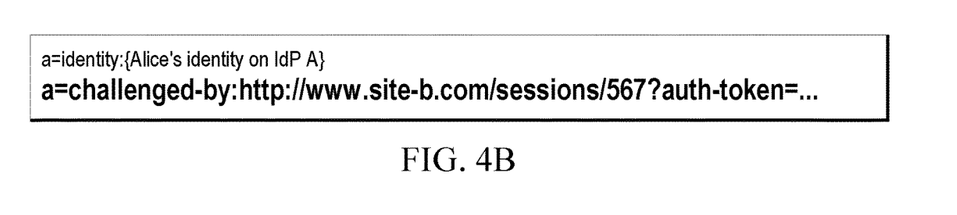
FIG. 4B is a schematic diagram of a format of an example answer SDP message.

At step 302, the server B 50 creates a session (e.g. session-b), and sends a challenge message back to the server A 30, in order to ask it to prove the identity of user A, and the server A 30 redirects the user equipment A to access session-b with the identity of user A. In an implementation, the challenge message may be a SDP message. For example, the challenge message may be an answer SDP message. A format of an example answer SDP message is illustrated in FIG. 4B.

At step 303, the server B 50 authenticates the identity of user A. The authentication of user A may be done through the IdP A 14 and the user equipment A 22.

At step 304, upon successful authentication of the identity of user A, the server B 50 alerts user equipment B 52 about incoming call from user A.

Figure 4C:
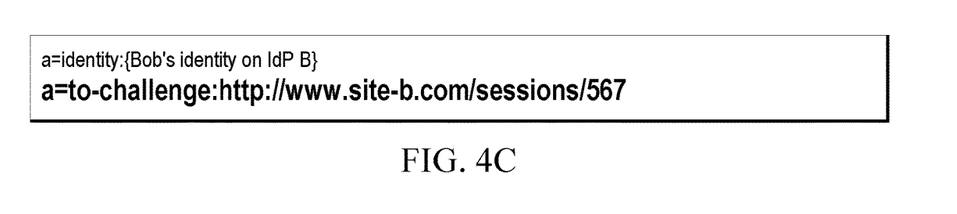
FIG. 4C is a schematic diagram of a format of another example answer SDP message.

At step 305, to answer the call, the user equipment B 52 sends a call answer message to the server A 30 via the sever B 50. The call answer message, for example, may include an identity of a user B associated with the user equipment B 52, a fingerprint (e.g. fingerprint-b) and a signature (e.g. signature-b). In an implementation, the user equipment B 52 may save fingerprint-b from the user equipment B 52 and signature-b generated from IdP B 54 in session-b. In another implementation, the call answer message may be a SDP message. For example, the call answer message may be an answer SDP message which specifies where the server A 30 can send a challenge message in response to the answer SDP message. A format of another example answer SDP message may be illustrated in FIG. 4C.

Figure 4D:
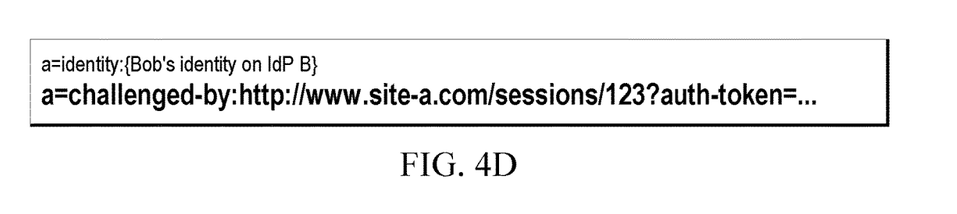
FIG. 4D is a schematic diagram of a format of another example offer SDP message.

At step 306, the server A 30 responds with a challenge message, in order to ask the server B 50 to prove the identity of user B. The server B 50 redirects the user equipment B 52 to access session-a with the identity of user B. In an implementation, the challenge message from the server A to the server B may be a SDP message. For example, the challenge message may be an offer SDP message. A format of another example offer SDP message may be illustrated in FIG. 4D.

At step 307, the server A 30 authenticates the identity of user B through the IdP B 54 and the user equipment B 52.

At step 308, upon successful authentication of the identity of user B, both session-a and session-b are authenticated and the call is established between the user equipment A 22 and the user equipment B 52.

For the call, the authentication chain for user A is (user equipment A 22, server A 30, IdP B 54, the identity of user B) where the user equipment A 22 authenticates/trusts the identity of user B because the user equipment A 22 authenticates/trusts the server A 30, the server A 30 authenticates/trusts the IdP B 54, and the IdP B 54 authenticates/trusts the identity of user B. Likewise, the authentication chain for user B is (user equipment B 52, server B 50, IdP A 14, the identity of user A) where the user equipment B authenticates/trusts the identity of user A because the user equipment B 52 authenticates/trusts the server B 50, the server B 50 authenticates/trusts the IdP A 14, and the IdP A 14 authenticates/trusts the identity of user B.

In one implementation, the authentication of the identity of user B may be optional and only the authentication of the identity of user A may be needed for establishing the call between the user equipment A 22 and the user equipment B 52. In another implementation, the authentication of the identity of user A may be optional and only the authentication of the identity of user B may be needed for establishing the call between the user equipment A 22 and the user equipment B 52.

In some implementations, the proxies may be optional if the identity protocol, for example WebID, is implemented by the user agents. When the proxies are used, the proxies only need to sign the fingerprints because the signature verification can be carried out by the servers, the IdPs and the user agents without involving the proxies.

The embodiment process may adapt the identity protocols for working with the RTCWEB network to implement security communication, thereby increasing interoperability between the identity protocols and the RTCWEB network. The security of this embodiment process is maintained because security-related confidential information (e.g. password) is only exchanged between the user equipment and the IdP. This embodiment process is also efficient and simplified because there is no additional layer to add in the RTCWEB network architecture. It is also extensible because a server may use different Identity protocols. Any suitable Identity protocol, for example, OpenID, WebID, or OAuth, may be implemented in this embodiment.

Figure 5:
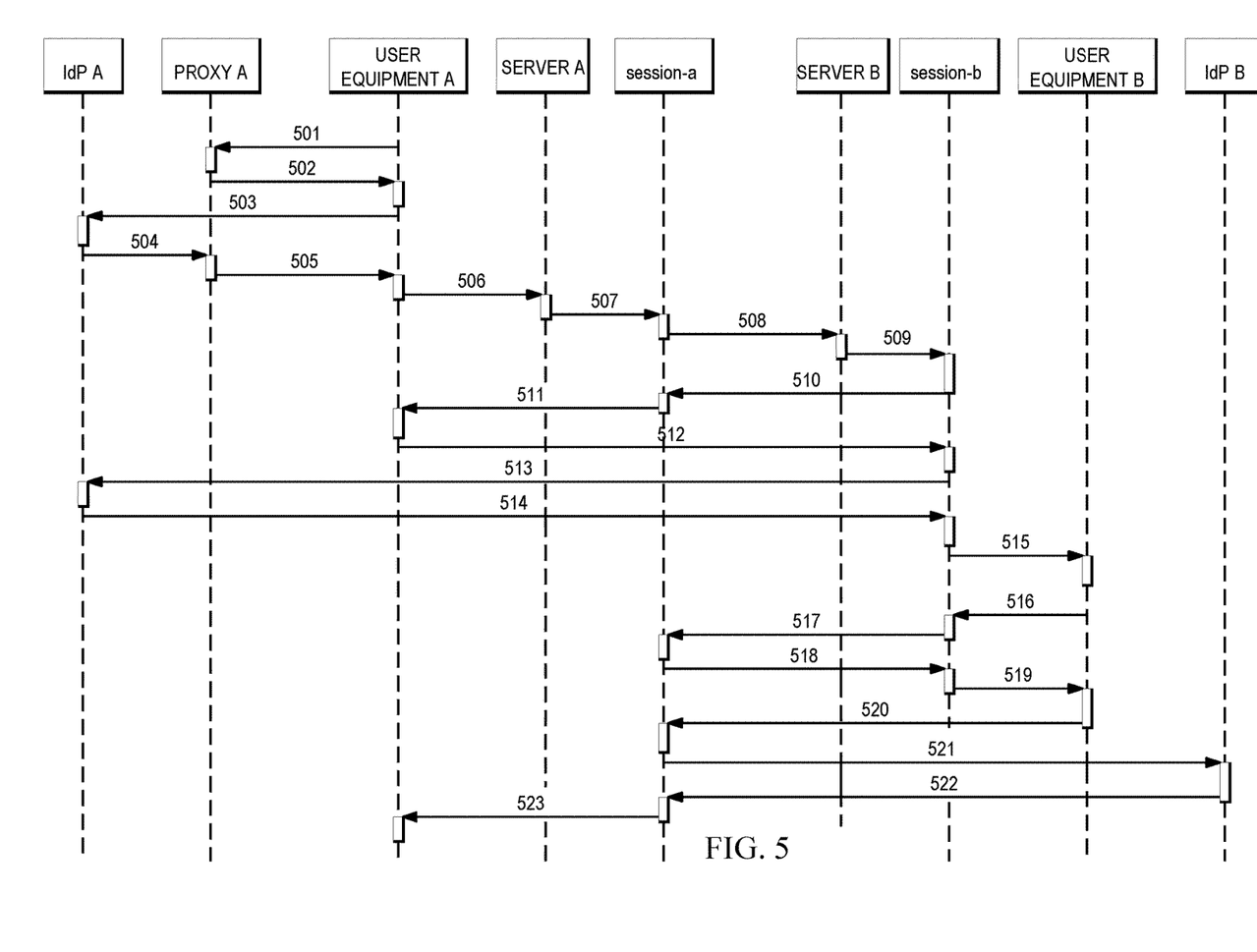
FIG. 5 is a flow diagram of another embodiment of a method of processing a RTCWEB authentication.

FIG. 5 is a flow diagram of another embodiment of a method of processing a RTCWEB authentication. For example, the embodiment method 500 may be implemented in the context of the RTCWEB network 70 architecture as illustrated in FIG. 2. The embodiment method 500 may proceed as follows as shown in FIG. 5.

At step 501, user equipment A 22 asks its corresponding proxy A 16 to sign a fingerprint (e.g. fingerprint-a) and an identity of a user A associated with the user equipment A 22. For example, in order to ask the proxy A 16 to sign, the user equipment A 22 may send a message to the proxy A 16. Proxy A may be a JavaScript proxy in some embodiments.

At step 502, the proxy A 16 asks the user equipment A 22 to login (authenticate to) IdP A 14.

At step 503, the user equipment A 22 authenticates to the IdP A 14 using a mechanism that is recognizable to the IdP A 14, for example, including the username and password. In an implementation, the user equipment A 22 sends an authentication request to the IdP A 14 with the username and password.

At step 504, the IdP A 14 informs the proxy A 16 that the authentication succeeds, and returns a signature (e.g. signature-a), along with the identity of user A and fingerprint-a to the proxy A 16.

A step 505, the proxy A 16 returns the signature-a, along with the identity of user A and the fingerprint-a to the user equipment A 22.

At step 506, the user equipment A 22 sends a call offer message to server A 30.

In one implementation, the call offer message may include, for example, the identity of user B associated with user equipment B, the identity of user A, the fingerprint-a of the user equipment A 22, and the signature-a from the IdP A 14. In another implementation, the call offer message may include, for example, the identity of user A, the fingerprint-a of the user equipment A 22, and the signature-a generated from the IdP A 14. In some implementations, the call offer message may be a session description protocol (SDP) message. As described in the above-mentioned embodiments, the call offer message may be an offer SDP message. With regard to the format of the SDP message, reference can be made to the above-mentioned embodiments.

At step 507, the server A 30 creates a session (e.g. session-a) and save the call related data in the session-a. In an implementation, the call related data may include the fingerprint-a from the user equipment A 22 and the signature-a generated from the IdP A 14.

At step 508, the server A 30 forwards the call offer message from the user equipment A 22 to server B 50 through the created session-a.

At step 509, the server B 50 creates a session (e.g. session-b) and save the call related data in the session-b. In an implementation, the call related data may include a fingerprint (fingerprint-b) from the user equipment B 52 and a signature (signature-b) from the IdP B 54.

At step 510, the server B 50 sends a challenge message to the session-a run on the server A 30 through the session-b, to request proving the identity of user A. In some implementations, the challenge message may be a SDP message. As described in the above-mentioned embodiments, the challenge message may be an answer SDP message. With regard to the format of the SDP message, reference can be made to the above-mentioned embodiments.

At step 511, the server A 30 redirects the user equipment A 22 to access the session-b run on the server B 50 through the session-a in response to the challenge message from the server B 50. In an example, the server A 30 sends to the user equipment A 22 an http response message which contains a status code and the uniform resource identifier (URI) to session-b, then the user equipment A 22 recognizes the redirect message by the status code, and visits the URI to session-b.

At step 512, the user equipment A 22 attempts to access session-b run on the server B 50 using the identity of user A.

At step 513, the session-b run on the server B 50 authenticates the identity of user A through the user equipment A 22 and the IdP A 14. The authentication process may contain more than one interaction between the three components (the server B 50, the user equipment A 22 and the IdP A 14), depending on the authentication protocol (i.e., identity protocol) implemented by the IdP A 14. Any suitable identity protocol, for example, OpenID, WebID, or OAuth may be implemented for the purpose of authentication. As the server B 50 trusts the IdP A 14 and accepts the authentication result of IdP A 14, the security of this embodiment process is maintained because security-related confidential information is generally exchanged between the user equipment A 22 and the IdP A 14.

At step 514, the server B 50 receives a notice of successful authentication from the IdP A 14 through the session-b. In another embodiment, if the server B 50 receives a notice of failed authentication, then the subsequent procedure may be terminated.

At step 515, the server B 50 forwards the call offer message to the user equipment B 52 through the session-b, to indicate the call from user A to user B.

At step 516, to answers the call, the user equipment B 52 sends a call answer message to the session-b run on the server B 50.

At step 517, the server B 50 forwards the call answer message to the session-a run on the server A through the session-b. In an implementation, the call answer message may include, for example, the identity of user B, the fingerprint-b and the signature-b. In some implementations, the call answer message may be a SDP message. As described in the above-mentioned embodiments, the call answer message may be an answer SDP message. With regard to the format of the SDP message, reference can be made to the above-mentioned embodiments.

At step 518, the server A 30 sends a challenge message to the session-b run on the server B 50 through the session-a, to request proving the identity of user B.

At step 519, the session-b run on the server B 50 redirects the user equipment B 52 to access the session-a run on the server A 30 in response to the challenge message from the server A 30. In an example, the server B 50 sends to the user equipment B 52 an http response message which contains a status code and the URI to session-a, then the user equipment B 52 recognizes the redirect message by the status code, and visits the URI to session-a.

At step 520, the user equipment B 52 attempts to access the session-a run on the server A 30 using the identity of user B.

At step 521, the session-a run on the server A 30 authenticates user B through the user equipment B 52 and the IdP B 54. This authentication process may contain more than one interaction between the three components (the server A 30, the user equipment B 52 and the IdP B 54), depending on the authentication protocol (i.e., identity protocol) implemented by the IdP B 54. Any suitable identity protocol, for example, OpenID, WebID, or OAuth may be implemented for the purpose of authentication. As the server A 30 trusts the IdP B 54 and accepts the authentication result of IdP B 54, the security of this embodiment process is maintained because security-related confidential information is generally exchanged between the user equipment B 52 and the IdP B 54.

At step 522, the server A 30 receives a notice of successful authentication from the IdP B 54 through the session-a. In another embodiment, if the server A 30 receives a notice of failed authentication, then the whole procedure may be terminated.

At step 523, the server A 30 forwards the call answer message to the user equipment A 22 through the session-a. A call is established between the user equipment A 22 and the user equipment B 52 with authenticated users.

In one implementation, the authentication of the identity of user B may be optional and only the authentication of the identity of user A may be needed for establishing the call between the user equipment A 22 and the user equipment B 52. In another implementation, the authentication of the identity of user A may be optional and only the authentication of the identity of user B may be needed for establishing the call between the user equipment A 22 and the user equipment B 52.

In some implementations, the proxies may be optional if the Identity protocol, for example WebID, is implemented by the user agents. When the proxies are used, the proxies only need to sign the fingerprints because the signature verification can be carried out by the servers, the IdPs and the user agents without involving the proxies.

The embodiment process may adapt the identity protocols for working with the RTCWEB network to implement security communication, thereby increasing interoperability between the identity protocols and the RTCWEB network. The security of this embodiment process is maintained because security-related confidential information (e.g. password) is generally exchanged between the user equipment and the IdP. This embodiment process is also efficient and simplified because there is no additional layer to add in the RTCWEB network architecture. It is also extensible because a server may use different Identity protocols. Any suitable Identity protocol, for example, OpenID, WebID, or OAuth, may be implemented in this embodiment.

Figure 6:
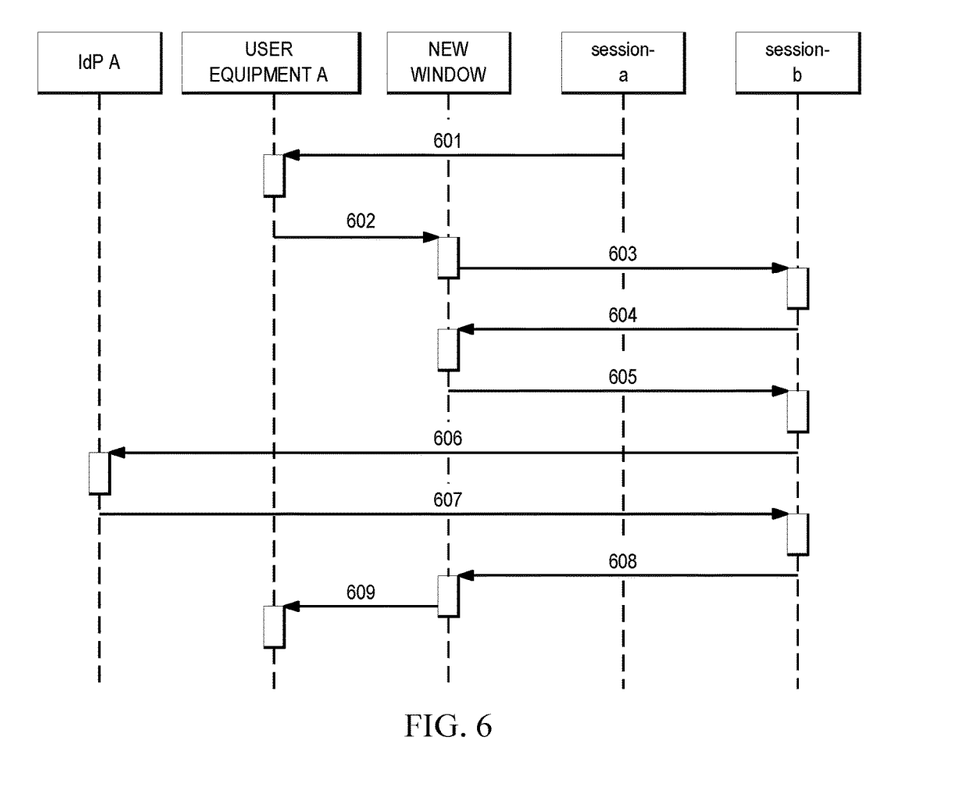
FIG. 6 is a flow diagram of an embodiment of a detailed process of steps 511-514 illustrated generally in FIG. 5.

In order to better describe the steps 511-514 as illustrated in FIG. 5, steps 511-514 are presented in more detail as an example in FIG. 6. FIG. 6 is a flow diagram of an embodiment of a detailed process of steps 511-514 illustrated generally in FIG. 5.

At step 601, the server A 30 redirects the user equipment A 22 to access the session-b run on the server B 50 through the session-a in response to the challenge message sent from the server B 50 in step 510 as illustrated in FIG. 5. In an example, the server A 30 sends to the user equipment A 22 an http response message which contains a status code and the URI to session-b, then the user equipment A 22 recognizes the redirect message by the status code, and visits the URI to session-b.

At step 602, the user equipment A 22 opens a new window to access the URI to session-b.

At step 603, the new window attempts to visit the URI to session-b with an http get request.

At step 604, the session-b returns a login HTML page to the new window.

At step 605, the new window sends the identity of user A to the session-b using an http post request.

At step 606, the session-b run on the server B 50 authenticates the identity of user A through the IdP A 14 and the user equipment A 22. The authentication process may contain more than one interaction between the three components (the server B 50, the user equipment A 22 and the IdP A 14), depending on the authentication protocol (i.e., identity protocol) implemented by the IdP A 14. Any suitable identity protocol, for example, OpenID, WebID, or OAuth may be implemented for the purpose of authentication.

At step 607, the session-b receives a notice of successful authentication from the IdP A.

At step 608, the session-b returns an http ok message in response to the http post request in step 605.

At step 609, the new window informs the user equipment A 22 the challenge is finished with success.

Figure 7:
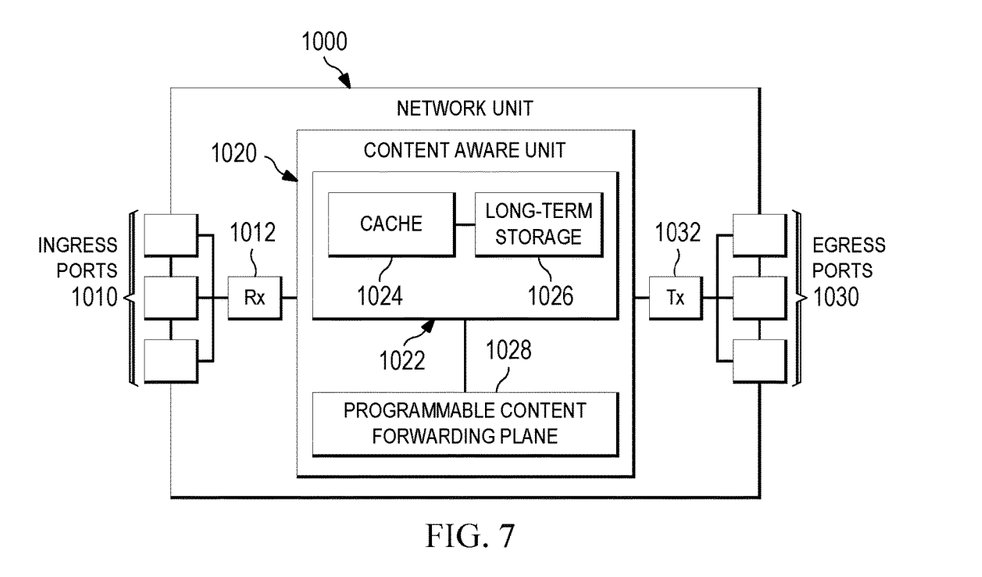
FIG. 7 illustrates an embodiment of a network unit.

FIG. 7 illustrates an embodiment of a network unit 1000, which may be any device that transports and processes data through, for example, the nodes of architecture 10 of FIG. 1 and FIG. 2 according to the present disclosure. For instance, the network unit 1000 may correspond to or may be located in any of the system nodes described above, such as the servers, the user equipments, the IdPs, and the proxies. The network unit 1000 may also be configured to implement or support the schemes and methods described above. The network unit 1000 may comprise one or more ingress ports or units 1010 coupled to a receiver (Rx) 1012 for receiving signals and frames/data from other network components. The network unit 1000 may comprise a content aware unit 1020 to determine which network components to send content to. The content aware unit 1020 may be implemented using hardware, software, or both. The network unit 1000 may also comprise one or more egress ports or units 1030 coupled to a transmitter (Tx) 1032 for transmitting signals and frames/data to the other network components. The receiver 1012, content aware unit 1020, and transmitter 1032 may also be configured to implement at least some of the disclosed schemes and methods above, which may be based on hardware, software, or both. The components of the network unit 1000 may be arranged as shown in FIG. 7.

The content aware unit 1020 may also comprise a programmable content forwarding plane block 1028 and one or more storage blocks 1022 that may be coupled to the programmable content forwarding plane block 1028. The programmable content forwarding plane block 1028 may be configured to implement content forwarding and processing functions, such as at an application layer or layer 3, where the content may be forwarded based on content name or prefix and possibly other content related information that maps the content to network traffic. Such mapping information may be maintained in one or more content tables (e.g. CS, PIT, and FIB) at the content aware unit 1020 or the network unit 1000. The programmable content forwarding plane block 1028 may interpret user requests for content and accordingly fetch content, e.g., based on meta-data and/or content name (prefix), from the network or other content routers and may store the content, e.g., temporarily, in the storage blocks 1022. The programmable content forwarding plane block 1028 may then forward the cached content to the user. The programmable content forwarding plane block 1028 may be implemented using software, hardware, or both and may operate above the IP layer or L2.

The storage blocks 1022 may comprise a cache 1024 for temporarily storing content, such as content that is requested by a subscriber. Additionally, the storage blocks 1022 may comprise a long-term storage 1026 for storing content relatively longer, such as content submitted by a publisher. For instance, the cache 1024 and the long-term storage 1026 may include Dynamic random-access memories (DRAMs), solid-state drives (SSDs), hard disks, or combinations thereof.

Figure 8:
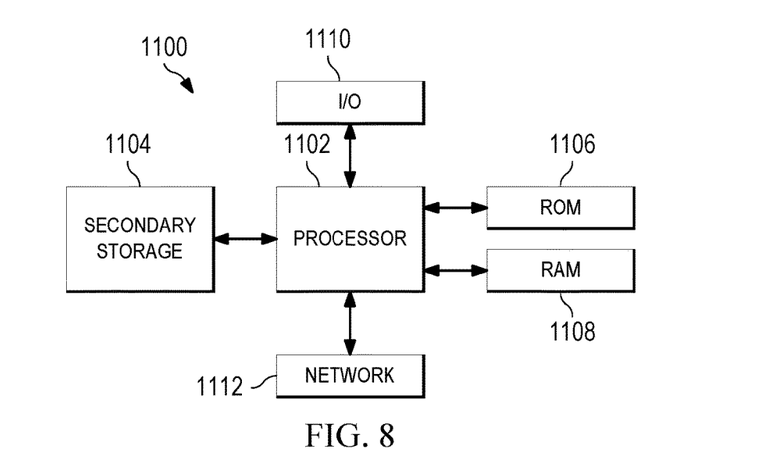
FIG. 8 illustrates a typical general-purpose network component.

The network components described above may be implemented on any general-purpose network component, such as a computer or network component with sufficient processing power, memory resources, and network throughput capability to handle the necessary workload placed upon it. FIG. 8 illustrates a typical, general-purpose network component 1100 suitable for implementing one or more embodiments of the components disclosed herein. The network component 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips, or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

It is contemplated that the various embodiments disclosed herein may be implemented in a number of ways. For example, in one embodiment, a method of processing a RTCWEB authentication by a second server is disclosed that includes receiving a call offer message from a first server including a first identity of a first user, a first fingerprint of a first user equipment and a first signature generated from a first IdP, sending to the first sever a first challenge message that request an authentication for the first identity, and performing an authentication for the first identity with the first user equipment and the first Idp. This method also includes receiving, by the second server, an authentication result for the first identity. In addition, this method may further include sending by the second server, the call offer message to a second user equipment, and receiving, by the second server, a call answer message from the second user equipment including a second identity of a second user, a second fingerprint of a second user equipment and a second signature generated from a second IdP in response to the authentication result indicating a successful authentication. Alternatively, this method may include sending, by the second server, to the first server the call answer message including the second identity of the second user, the second fingerprint of the second user equipment and the second signature generated from the second IdP, receiving, by the second server, from the first server a second challenge message that requests an authentication for the second identity, and redirecting the second user equipment to access the first server.

In some embodiments, the call offer message is an offer SDP message that specifies where the second server sends the first challenge message. In other embodiments, the call answer message is an answer SDP message that specifies where the first server sends the second challenge message.

It is contemplated that the systems and methods disclosed herein may further includes creating, by the second server, a second session, and saving, by the second server, the second identity, the second fingerprint and the second signature in the second session.

It is further contemplated that a second server for processing a RTCWEB may be used. The second server includes a memory storage comprising instructions. In addition, the second server further includes one or more processors coupled to the memory that execute the instructions to receive a call offer message from a first server including a first identity of a first user, a first fingerprint of a first user equipment and a first signature generated from a first identity provider (IdP), send to the first sever a first challenge message that request an authentication for the first identity, and perform an authentication for the first identity with the first user equipment and the first Idp.

In this embodiment, the one or more processors further execute the instructions to receive an authentication result for the first identity. Also in this embodiment, one or more processors in the second server further execute the instructions to send the call offer message to a second user equipment, and receive a call answer message from the second user equipment including a second identity of a second user, a second fingerprint of a second user equipment and a second signature generated from a second IdP in response to the authentication result indicating a successful authentication. The one or more processors in the second server of this embodiment may further execute the instructions to send to the first server the call answer message including the second identity of the second user, the second fingerprint of the second user equipment and the second signature generated from the second IdP, receive from the first server a second challenge message that requests an authentication for the second identity, and redirect the second user equipment to access the first server. In some embodiments, the call offer message may be an offer session description protocol (SDP) message that specifies where the second server sends the first challenge message. In other embodiments, the call answer message may be an answer SDP message that specifies where the first server sends the second challenge message. It is contemplated that the one or more processors in the second server of may further execute the instructions to create a second session, and save the second identity, the second fingerprint and the second signature in the second session.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of processing a real-time communication in web-browsers (RTCWEB) authentication by a first server, comprising:
   receiving a message from a first user equipment, with the message including a first identity of a first user, a first fingerprint of the first user equipment, and a first signature generated from a first Identity provider (IdP);
   sending a call offer message including the first identity, the first fingerprint, and the first signature to a second server associated with a second user equipment;
   receiving from the second server a first challenge message that requests an authentication of the first identity;
   redirecting the first user equipment to access the second server;
   receiving from the second server a call answer message including a second identity of a second user, a second fingerprint of the second user equipment and a second signature generated from a second IdP, wherein the call answer message is an answer session description protocol (SDP) message that specifies a destination of a second challenge message to be sent by the first server; and
   responding to the second server with the second challenge message that requests an authentication of the second identity.

2. The method of claim 1, further comprising:
   performing an authentication of the second identity with the second IdP and the second user equipment.

3. The method of claim 2, further comprising:
   receiving an authentication result of the second identity.

4. The method of claim 3, wherein upon the authentication result indicating a successful authentication, the method further comprises:
   establishing a call between the first user equipment and the second user equipment.

5. The method of claim 1, wherein the call offer message is an offer SDP message that specifies a second destination of the first challenge message sent by the second server.

6. The method of claim 1, further comprising:
   creating a first session; and
   saving the first identity, the first fingerprint and the first signature in the first session.

7. A method of processing a real-time communication in web-browsers (RTCWEB) authentication by a first user equipment, comprising:
   sending a call offer message including a first identity of a first user, a first signature generated from a first identity provider (Idp), and a first fingerprint of the first user equipment to a second server associated with a second user equipment via a first server, wherein the call offer message is a session description protocol (SDP) message that specifies a destination of a challenge message to be sent by the second server, with the challenge message requesting an authentication of the first identity of the first user;

receiving from the first server a redirection message that instructs the first user equipment to access the second server;

accessing the second server with the identity of the first user equipment;

performing the authentication of the first identity with the second server and the first ldp; and establishing a call between the first user equipment and the second user equipment upon successful authentication of the first identity and a second identity of a second user associated with the second user equipment.

8. The method of claim 7, further comprising:
receiving, by the first user equipment, the first identity, the first signature and the first fingerprint from the first ldp.

9. The method of claim 7, wherein the accessing the second server comprises accessing a second session on the second server through a uniform resource identifier of the second session.

10. A first server for processing a real-time communication in web-browsers (RTCWEB) authentication, comprising:
a memory storage comprising instructions; and
one or more processors coupled to the memory, with the one or more processors executing the instructions to:
receive from a first user equipment a message including a first identity of a first user, a first fingerprint of the first user equipment, and a first signature generated from a first Identity provider (IdP);
send a call offer message including the first identity, the first fingerprint and the first signature to a second server associated with a second user equipment;
receive from the second server a first challenge message that requests an authentication of the first identity;
redirect the first user equipment to access the second server;
receive from the second server a call answer message including a second identity of a second user, a second fingerprint of the second user equipment and a second signature generated from a second IdP, wherein the call answer message is an answer session description protocol (SDP) message that specifies a destination of a second challenge message to be sent by the first server; and
respond to the second server with the second challenge message that requests an authentication of the second identity.

11. The first server of claim 10, wherein the one or more processors further execute the instructions to:
perform an authentication of the second identity with the second IdP and the second user equipment.

12. The first server of claim 11, wherein the one or more processors further execute the instructions to:
receive an authentication result of the second identity.

13. The first server of claim 12, wherein the one or more processors further execute the instructions to:

establish a call between the first user equipment and the second user equipment upon the authentication result indicating a successful authentication.

14. The first server of claim 10, wherein the call offer message is an offer SDP message that specifies a second destination of the first challenge message sent by the second server.

15. The first server of claim 10, wherein the one or more processors further execute the instructions to:
create a first session; and
save the first identity, the first fingerprint and the first signature in the first session.

16. A first user equipment for processing a real-time communication in web-browsers (RTCWEB) authentication, comprising:
a memory storage comprising instructions; and
one or more processors coupled to the memory, with the one or more processors executing the instructions to:
send a call offer message including a first identity of a first user, a first signature generated from a first identity provider (Idp), and a first fingerprint of the first user equipment to a second server associated with a second user equipment via a first server, wherein the call offer message is a session description protocol (SDP) message that specifies a destination of a first challenge message to be sent by the second server, with the first challenge message requesting an authentication of the first identity of the first user;
receive from the first server a redirection message that instructs the first user equipment to access the second server;
access the second server with the identity of the first user equipment and receive from the second server a call answer message including a second identity of a second user, a second fingerprint of the second user equipment and a second signature generated from a second IdP, wherein the call answer message is an answer SDP message that specifies a destination of a second challenge message to be sent by the first server;
perform the authentication of the first identity with the second server and the first ldp; and
establish a call between the first user equipment and the second user equipment upon successful authentication of the first identity and a second identity of a second user associated with the second user equipment.

17. The first user equipment of claim 16, wherein the one or more processors further execute the instructions to:
receive the first identity, the first signature and the first fingerprint from the first Idp.

18. The first user equipment of claim 16, wherein the one or more processors execute the instructions to access a second session on the second server through a uniform resource identifier of the second session.

* * * * *